United States Patent [19]

Gibbs et al.

[11] 3,950,210
[45] Apr. 13, 1976

[54] VACUUM PRESS

[75] Inventors: David A. Gibbs, Waban; Domenico S. Sarcia, Carlisle, both of Mass.

[73] Assignee: Seal Incorporated, Derby, Conn.

[22] Filed: Apr. 10, 1973

[21] Appl. No.: 349,815

[52] U.S. Cl. ............... 156/367; 100/93 P; 156/583
[51] Int. Cl.² .................. B30B 15/34; B32B 31/00
[58] Field of Search ......... 156/583, 286, 358, 359, 156/367, 378, 381, 382, 87, 285, 108, 559, 228; 100/93 P, 211; 425/405 R; 219/243

[56] References Cited
UNITED STATES PATENTS

| | | | |
|---|---|---|---|
| 2,575,734 | 11/1951 | Schulman | 425/405 |
| 2,771,619 | 11/1956 | Stewart | 100/211 |
| 2,794,104 | 5/1957 | Nathan | 156/583 |
| 2,990,872 | 7/1961 | Gaby | 100/211 |
| 3,493,451 | 2/1970 | Beery | 156/583 |
| 3,500,566 | 3/1970 | Holyoake | 100/211 |
| 3,738,890 | 6/1973 | Johnson et al. | 156/286 |

*Primary Examiner*—William A. Powell
*Assistant Examiner*—J. J. Gallagher
*Attorney, Agent, or Firm*—Schiller & Pandiscio

[57] ABSTRACT

An improvement in vacuum presses for mounting and laminating graphic arts objects such as photographs and the like, the improvement consisting of providing a platen assembly comprising a flexible metal platen that is supported only at its edges and is engaged and heated by a flexible heater unit.

3 Claims, 7 Drawing Figures

VACUUM PRESS

This invention relates to preparation of laminated articles and more particularly to presses for cohesively bonding together two or more sheets of selected materials by application of heat and pressure.

The practice has developed of joining flexible or easily damaged graphic arts objects, like photographs, prints, charts, maps, printed documents, xerographic reproductions, etc., to other sheet materials to provide stiffness and tear-resistance and also to protect image surfaces. In the case of photographs, for example, substrates such as cardboard, Masonite and foamed plastic panels are commonly joined to one side for stiffness while transparent plastic films of materials such as Mylar are commonly joined to the front side for image protection. For convenience, in the graphic arts industry, the procedure of joining a photograph or similar object to a backing sheet is called "mounting" while the procedure of joining a transparent film to the front side of a photograph or like object is called "laminating". When the photograph or other object is attached to a backing sheet by means of a tape or sheet coated on both sides with a hot melt adhesive, it is called "dry mounting".

A number of problems are encountered in laminating and dry-mounting photographs and other graphic arts media such as already mentioned. These problems include wrinkling, uneven application of pressure and temperature, bubbles caused by air or moisture trapped between the laminated layers, and heat degradation (particularly of colored photographs) due to localized heating excesses. Achieving a high quality lamination is particularly critical in the case of a large expensive photograph since a poor lamination cannot be rectified and results in either a total loss or a sizeable reduction in the market value of the photograph. Two forms of presses are known for laminating and dry mounting photographs and similar graphic arts media. One form of apparatus is a hydraulically-operated flat platen press which comprises heated platens that are brought together under relatively high pressure so as to bond together the assembled components of a "workpiece". This type of press is expensive, cumbersome, large and relatively slow. Furthermore, even using substantial skill and a high degree of care, it is difficult with such equipment to consistently achieve flawless laminations of transparent film to the front side of photographs due to the inability to allow for escape of mositure and air.

A second form of apparatus is a so-called "vacuum press", so-called because it makes use of the well-known technique (see, for example, U.S. Pat. Nos. 3,346,442 and 2,783,176) of generating the pressure required for bonding materials together under heat and pressure by pulling a vacuum in a contractable chamber containing the materials to be bonded. A vacuum press suitable for laminating and dry mounting graphic arts media is described in copending U.S. patent application Ser. No. 132,359, filed Apr. 8, 1971 by T. C. Johnson et al. for VACUUM PRESS, now U.S. Pat. No. 3,738,890. The press described in said application comprises a base having an open horizontal frame, a flexible air-impermeable wall mounted on top of and extending across the open frame, a platen assembly including a flat platen and means for heating the platen, means providing a hinged connection between one end of the platen assembly and the base so that the platen assembly can be moved from a first open position in which the upper surface of the flexible wall is exposed to view and a second closed position in which the platen overlies the flexible wall, gasket means attached to the flexible wall where it is secured to the frame for providing an air-tight seal between the platen assembly and the flexible wall, means for evacuating the closed chamber formed by the flexible wall and the platen when the platen assembly is in a closed position, and means for operating the evacuating means and the platen heating means so as to effect bonding of the components of the workpiece by heat and pressure.

Although the above-described type of vacuum press offers a number of advantages, including relatively modest cost, ease of use, and ability to laminate and/or dry mount graphic arts objects of different sizes, its platen assembly has a number of limitations which prevent the equipment from consistently achieving substantially perfect results when laminating and/or dry-mounting large size photographs and other graphic arts media that are highly susceptible to heat degradation. Primarily, these limitations consist of localized "cold spots" and point-to-point variations in pressure along the interface of the platen and workpiece, so that it is difficult to consistently achieve uniform bonding along the full expanse of the workpiece.

Accordingly, the primary object of the present invention is to provide a new and improved vacuum press for laminating and/or mounting large size photographs, prints, maps and other graphic arts materials which is free of the limitations of prior vacuum presses designed for the same applications.

A more specific object of the invention is to provide aa vacuum press of the character described having a new and improved platen assembly which is substantially free of localized cold spots and is capable of co-acting with the flexible air-impermeable wall to effect more nearly uniform compression of the workpiece along the full expanse of the interfaces of the layers of the workpiece so as to provide uniform bonding.

Other objects and many of the attendant advantages of this invention are achieved by a vacuum press of the character described which comprises a platen assembly having a flexible platen which is mounted so as to provide intimate contact with the workpiece at all points along the adjacent surface of the workpiece, can expand and contract freely under changes in temperature, and is free of significant heat-sink effects tending to produce localized cold spots. Other features and advantages of the invention are described or rendered obvious in the following detailed description of a preferred embodiment of the invention which is to be considered together with the accompanying drawings, wherein:

In the press described in said U.S. Pat. No. 3,738,890, the platen is substantially rigid, being supported at its edges and also at a number of points intermediate its edges. It has been discovered that the means employed to support the platen intermediate its edges have a heat-sink effect tending to produce localized cold spots or at least a distinct temperature gradient in the platen. As a consequence, and depending on the rate of heating, the cold spot areas of the platen may not be hot enough to thermally activate the adhesive in the workpiece or the other areas of the platen may be so hot as to thermally degrade one or more components of the workpiece. It also has been discovered that with a platen assembly as described in said U.S. Pat. No. 3,738,890, achievement of uniform bonding, particularly in bonding a laminating film to a photograph or other graphic arts object, depends on the flatness of the platen and workpiece. Although the platens are made with a high degree of flatness, they may go out of flat under repeated heating and cooling cycles. The out-of-flatness of the platens may occur as a variation in thickness or as a ripple along its surface. Furthermore, although some components of the workpiece such as laminating film, photograph, or other graphic arts object, and mounting tissue are relatively thin and also have fairly uniform thicknesses, it is not uncommon for the substrate components of the workpiece to have a varying thickness. Moreover, some substrate materials, e.g. ¼ inch Masonite, have a relatively high resistance to compression which limits the ability of the workpiece to yield to compensate for variations in flatness or thickness. In either event, whether it is the work object or platen that is not flat, it is difficult to achieve uniform bonding of the components of the workpiece since, unlike an hydraulic press, the maximum pressure acting to draw the platen and the air-impermeable flexible sheet together is limited and may not be sufficient to overcome the effect of variations in flatness of the relatively rigid platen and/or relatively incompressible substrate. It has been found that more consistently uniform bonding can be achieved by (1) employing a flexible platen and (2) supporting the platen only at its edges, whereby the working area of the platen is free of localized heat sink effects and can yield under the available applied pressure to the extent required to fully and uniformly bond together the several components of the workpiece. Preferably, also the heating element is designed to provide enough heat input to the marginal portions of the platen to compensate for radiative heat losses at the edges of the platen, whereby to render the platen more nearly isothermal.

Turning now to FIGS. 1–4, the illustrated press is substantially the same, except for certain differences in the platen assembly and the work support assembly, to the vacuum press described and illustrated in said copending application Ser. No. 132,359, now U.S. Pat. No. 3,738,890. It comprises a self-standing table-like base or work support assembly 2 and a hinged platen assembly 4. The work support assembly includes a rectangular frame consisting of metal U-shaped channel members 6, 8, 10 and 12. These channel members are secured to each other by suitable means, e.g. by welding, and the frame is reinforced by two parallel beams 14 and 16 of L-shaped cross-section. Beams 14 and 16 extend between frame members 10 and 12 and are secured, preferably by welding, to the under surfaces of the lower flange 18 of those members. The frame further includes a plurality of cross bars 20 which extend over beams 14 and 16 between the frame members 6 and 8 and are secured to the upper surfaces of the lower flanges 18 of those frame members. Crossbars 20 are also of U-shaped cross-section.

The frame is supported at waist height by two identical leg assemblies. These leg assemblies consist of front and rear vertical legs 26 and 28 that are bolted to the beams 14 and 16 as shown at 30 in FIG. 5. Each leg assembly comprises suitable braces or struts as shown at 32 and 34 which connect the legs and provide rigidity to the leg assemblies. Additional struts 36 and 38 connect the front and rear legs 26 and 28 to the beams 14 and 16 respectively so as to provide rigidity to the work support assembly.

Figure 2:
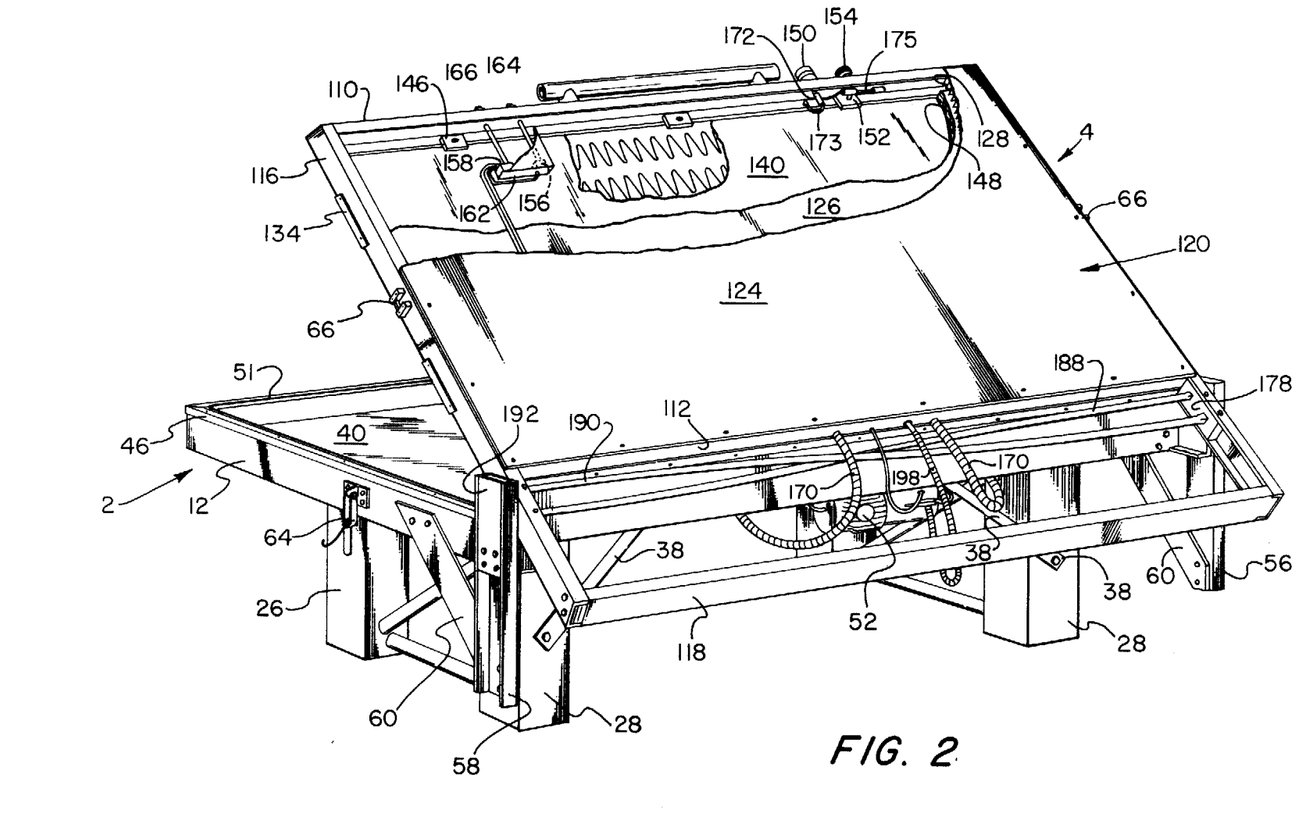
FIG. 2 is a rear perspective view of the same vacuum press with certain parts broken away.
Figure 5:
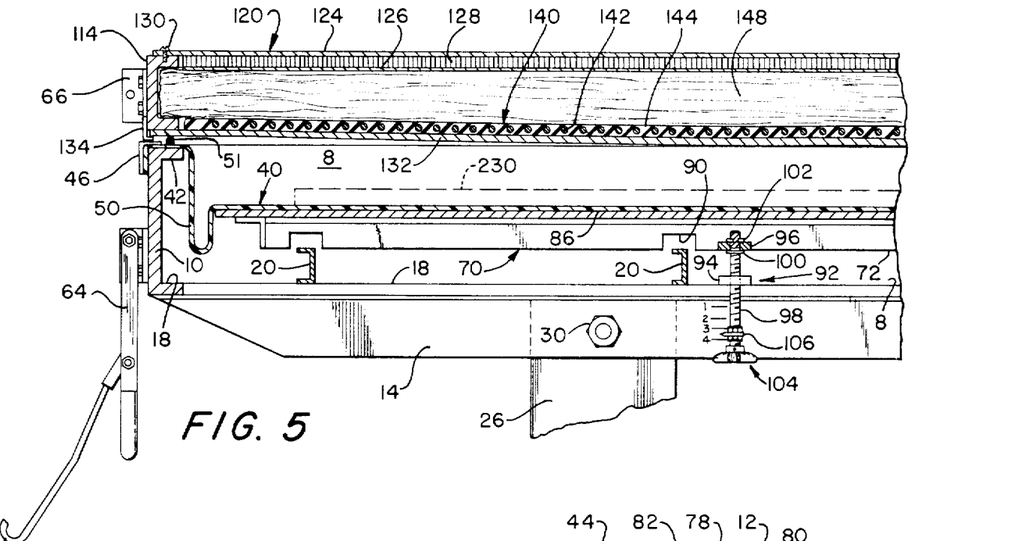
FIG. 5 is a cross-sectional view taken substantially along line 5—5 of FIG. 3.
Figure 5A:
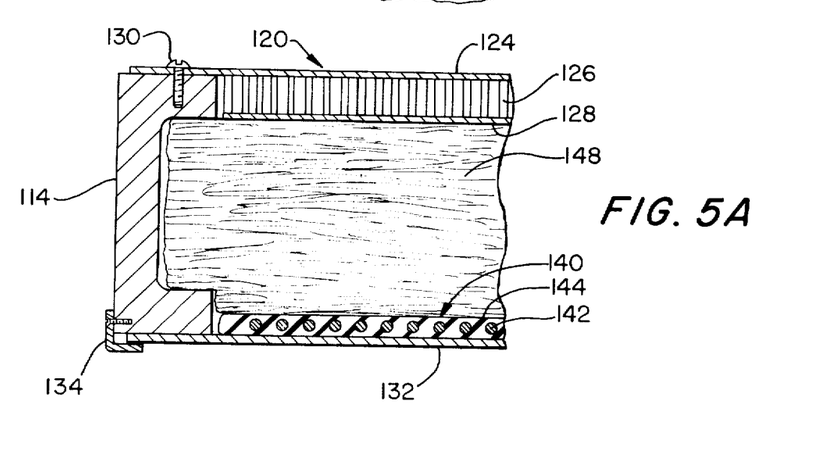
FIG. 5A is an enlargement of a portion of FIG. 5.

Secured to and supported by the frame of the work support assembly is a sheet 40 of flexible air-impermeable material that functions as a work supporting wall or bed. Preferably the sheet 40 is made of a natural or synthetic rubber, e.g. a silicone rubber. However, it may also be a flexible plastic or a rubber or plastic coated fabric. In the illustrated embodiment, the sheet 40 extends fully across the open frame and is wrapped over the upper flanges 42 of the frame members 6–12 as shown in FIG. 5. The margins of sheet 40 extend down over a portion of the outer surfaces of the four frame members as shown in FIG. 5, and are sandwiched between and clamped by the frame members and retaining strips 46 (FIGS. 2 and 5). The retaining strips are of L-shaped cross-section and are secured to the frame members 6–12 by means of screws 48. The retaining members clamp the marginal portion of the flexible sheet 40 tightly against the supporting frame members with sufficient strength to support the sheet 40 and to prevent it from being pulled out under the load of the workpiece of the operating pressure to which it is subjected. It is to be noted that the size of the flexible wall 40, i.e. its length and width, are substantially large enough so as to permit the wall to slump like a catenary as shown as 50 (FIG. 5) when it is not drawn tight against the platen of the platen assembly. Attached to the upper side of the flexible sheet 40 directly over the upper flanges of the channel members so as to be supported thereby is a rectangular peripheral seal or gasket 51 which is made of a resilient heat-resistant material such as silicone rubber. The seal 51 is located inside of the retaining strips 46 as shown in FIG. 5.

Also forming part of the work support assembly are a vacuum pump 52 which is attached to the underside of the rear end of the frame and a control console 54 which is attached to the underside of the front portion of the frame. Attached to the rear end of the opposite sides of the frame of the work support assembly are two vertically extending channel members 56 and 58 which are reinforced by braces 60 that also are secured to the end frame members 10 and 12. The channel members 56 and 58 form part of a torsion bar hinge assembly which is described below. Completing the work support assembly are two toggle clamps 64 attached to the side frame members 10 and 12. These toggle clamps are designed to be latched to two brackets 66 carried by the platen assembly described below.

The work support assembly also includes an adjustable support 70 which is adapted to support the resilient wall 40. The support 70 forms no part of the present invention but is illustrated and described herein in order to facilitate understanding and appreciation of the present invention.

Figure 6:
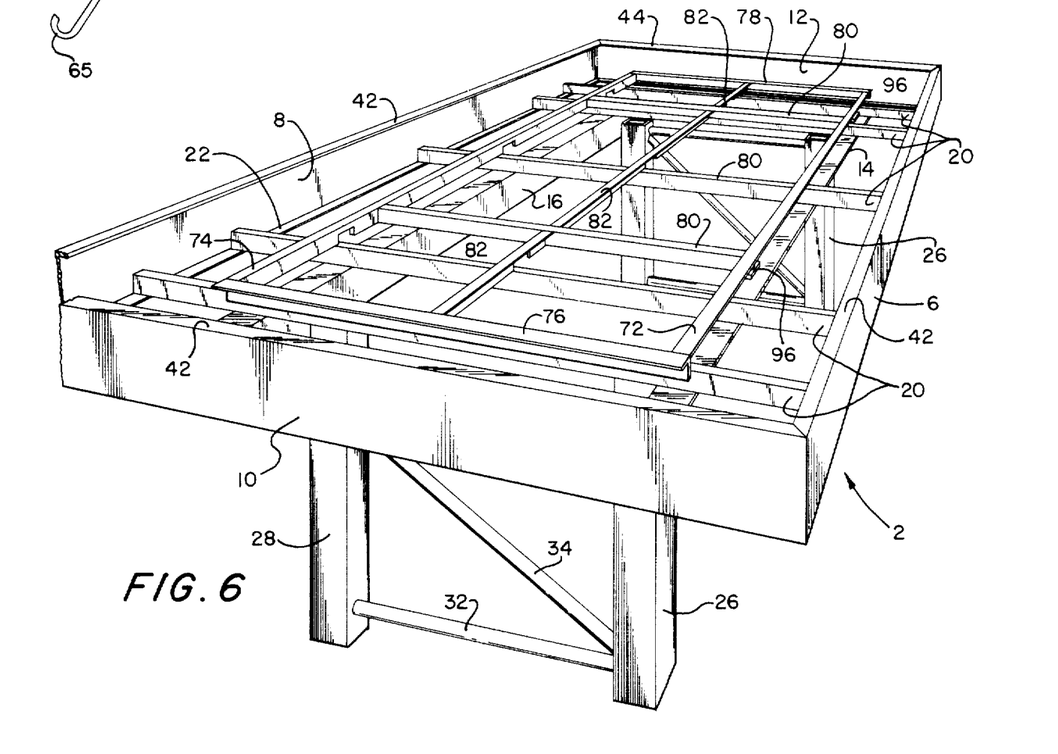
FIG. 6 is a perspective view of the base assembly.

Referring to FIGS. 5 and 6, the support 70 comprises front and rear aluminum angle members 72 and 74 and opposite side angle members 76 and 78. Extending between angle members 72 and 74 are three aluminum angle members 80 as shown in FIG. 6. These angle members are welded to one another so as to form a rigid frame. Additionally, center angle members 82 extend between the members 76, 80 and 78 and also are welded thereto so as to form a rigid unit. Overlying this unit and attached by suitable means such as screws is a panel 86 which preferably is made of asbestos but also may be made of some other suitable material that is capable of withstanding the temperatures to which the flexible wall 40 is heated and also has sufficient strength to support the weight of that wall. The support unit 70 overlies the crossbars 20 of the frame and its angle members 72, 74 and 82 are notched as shown at 90 so as to be capable of dropping down on the crossbars below the height illustrated in FIG. 5. The adjustable support 70 is connected to the frame by means of four adjusting mechanisms identified generally (see FIG. 5) by the numeral 92. Two of these mechanisms are coupled to beam 14 and the other two are coupled to beam 16. For convenience, and since they are all alike, only one of these mechanisms is shown in detail.

Referring now to FIGS. 5 and 6, each adjusting mechanism 92 consists of a plate 94 that has a threaded hole and is secured to the upper surface of the horizontal flange of the front beam 14 or the rear beam 16, a second plate 96 that is welded to the vertical surface of the front angle member 72 or the rear angle member 74 of support 70, and a threaded rod 98 which is screwed into the hole in plate 94 and extends through aligned holes in the plate 96 and the horizontal flange of the associated beam 14 or 16. The rod 98 has a reduced diameter where it enters the plate 96 so as to form a shoulder which supports a washer 100 which engages the underside of the plate 96. The reduced diameter end of the screw 98 also has a groove to receive a snap ring 102 which engages the upper surface of the plate 96. A handle 104 is attached to the lower end of the screw 98. Additionally, a pointer element 106 is mounted on and secured to the threaded screw 98. Graduations as shown by the numerals 1, 2, 3, 4 in FIG. 5 are provided on the adjacent surface of the beam 14 and 16. These graduations and the pointer 106 cooperate to indicate the depth of the space between the platen and that portion of flexible wall 40 which is supported by the panel. It is to be realized that the two mechanisms 92 that are attached to beam 14 are spaced apart in the manner of plates 96 in FIG. 6 and are aligned front-to-rear with the other two mechanisms that are attached to beam 16. In other words, the four mechanisms 92 are disposed in a rectangular or square array. By turning the four screws 98, it is possible to raise and lower the support 70 and, by means of the pointers 106, to position the screws 98 so that the panel 86 is horizontal.

Referring now to FIGS. 1, 2, 3, 5 and 5A, the platen assembly comprises a rectangular frame made up of four channel members 110, 112, 114 and 116 which preferably are made of aluminum and are connected to each other by welding or by suitable fastening means. Frame members 110 and 112 extend rearwardly beyond frame member 116 and their rear ends are connected by a fifth channel member 118, also preferably made of aluminum. Attached to the top side of the frame so as to conceal the space between the frame members 110–116 is a light weight yet sturdy cover member 120 which preferably comprises two thin aluminum plates 124 and 126 separated by and secured to a honeycomb reinforcing structure 128. Plate 124 is secured to the frame members by screws 130. Mounted on the underside of the frame is a metal platen 132 whose length and width are slightly less than the corresponding dimensions of the frame measured between the outside vertical surfaces of channel members 110 and 112 and the outside vertical surfaces of channel members 114 and 116. The metal platen is held in place solely by means of a plurality of aluminum angle retainer strips 134 which are secured by screws mounted in tapped holes in the outer surfaces of frame members 110–116. As seen in FIG. 5, retainer strips 134 underlie the marginal portions of the platen and hold the latter against the underside of frame members 110–116. The retainer strips are mounted so as to permit relatively sliding movement of the engaged marginal portions of the platen when the platen undergoes expansion or contraction due to changes in its temperature. At room temperature the edges of the platen are spaced from retainer strips 134 as shown in FIG. 5, whereby to permit the platen to expand laterally when heated.

In accordance with this invention, the platen 132 is made of relatively thin metal sheet stock that is relatively flexible and tends to droop under its owwn weight when supported only at its edges. Hence, when the platen assembly is closed, the center portion of the platen will hang lower than its marginal portions which are supported against the frame of the platen assembly by means of retainer strips 134. This drooping action is illustrated in FIG. 5. The retainer strips allow the platen to expand and contract unimpeded in accordance with changes in its temperature produced by operation of the heating means described below. By way of example, the platen may be a flat sheet of aluminum having a thickness of about 1/16 inch. The platen also may be made of steel or other metal or metal alloy so long as it is flexible, but an aluminum platen is preferred because it weighs less and has high heat conductivity.

The platen assembly also includes electrical heating means for the platen. The heating means preferably comprises a single flexible electrical heating unit 140, but as an alternative measure, it may comprise a plurality of smaller size units disposed side-by-side. The heating unit preferably comprises a flexible electrical resistance wire heating element 142 encased in a sheet or pad 144 of a heat resistant elastomeric material such as a silicone rubber or other synthetic elastomer. Alternatively, the heating element 142 may be replaced by an etched foil type resistance heating unit. The wire heating element is arranged in a tortuous configuration within the elastomer sheet to provide the desired heat distribution. It also is preferred that the wire heating element be arranged so that it provides a greater heat density (i.e. greater heat output) at the margins of the platen to compensate for radiative heat losses. The use of a flexible heating unit of the type described is preferred since it enables the heating unit to flex with the lie closely against the platen so as to minimize occurrence of air gaps which might result in substantial variations in platen temperature due to uneven heat input. The heating unit directly engages the platen and is held in place preferably by cementing the front edge of its elastomer sheath directly to the platen. Alternatively or additionally, the heating unit may be held in place by spring clamps 146 (see FIG. 2) that are affixed by screws to frame members 110–116. Clamps 146 are adapted to permit expansion of the heater unit when it is energized. Filling the space between the heater unit and cover member 120 is a heat insulating blanket 148 preferably made of fiberglass. The heat insulating blanket is compressible and thus provides a spring force which urges the resilient heater element close against the platen. If the spring force or pressure exerted by blanket 148 on the heating unit is sufficiently high to hold the heater unit in firm contact with the platen, cementing the heater unit to the platen may be omitted.

Figure 1:
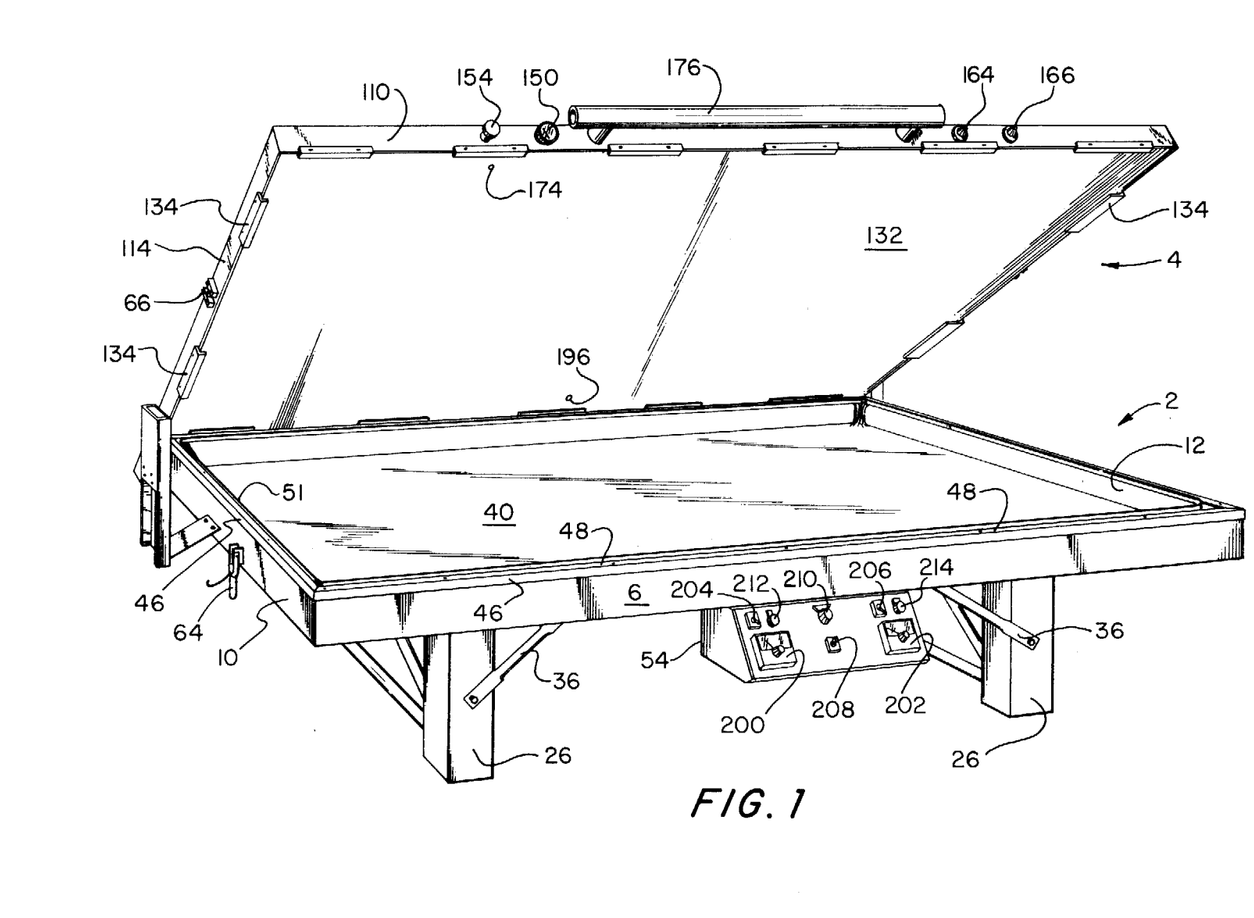
FIG. 1 is a front perspective view of a vacuum press constructed in accordance with the present invention, with the cover assembly in raised position.

Referring now to FIGS. 1 and 2, the platen assembly further includes a conventional vacuum gauge 150, a manually operable control valve 152 having a control knob 154 and two thermostats 156 and 158 of conventional design. The two thermostats are disposed below insulating blanket 148 in direct engagement with the heater unit and are affixed to a bracket 162 that is preferably cemented to the heater unit but alternatively may be secured to channel member 110. The thermostats are adjustable, having rotary control shafts that extend through channel member 110 and are fitted with control knobs 164 and 166 respectively. By way of example, the thermostats may be of the type B-200 manufactured by American Thermostat Company of South Cairo, New York. The thermostats open at different predetermined temperatures as described below. The thermostats and the heater unit are connected to a source of electrical power and to control circuit elements in console 54 by way of cables such as shown at 170 passing through the channel member 112.

Referring to FIG. 2, the stem of vacuum gauge 150 is connected to one side of a tee-fitting 172, while a second side of the same tee-fitting is connected by a tube 173 to a small bleeder port 174 (see FIG. 1) in the platen. The third side of the tee-fitting is connected to one of the ports of control valve 152. The other port of valve 152 is fitted with an open tube 175 that communicates with air in the space above the platen which is essentially at atmospheric pressure since the cover member is not hermetically sealed to the frame of the platen assembly. Valve 152 is normally closed so that gauge 150 will be responsive to the pressure within the work chamber formed by the platen and flexible wall 40 when the platen assembly is in its closed position as hereinafter described.

The foregoing platen assembly is hinged to the channel member 56 and 58 of the work support assembly as described below and a handle 176 is provided to swing the platen assembly into operating position. The hinged connection, which is best seen in FIGS. 1, 2, 3 and 4, comprises a torsion bar mechanism as described in said copending U.S. patent application Ser. No. 132,359.

Attached to the inner side of each of the channel members 114 and 116 immediately rearward of channel member 112 are retaining blocks 178 and 179. Additional retaining blocks 180 and 181 are secured to the upper ends of channel members 56 and 58. The hinge connections are formed by providing round aligned openings 182 in frame members 114 and 116 and retaining blocks 178 and 179 rearward of frame member 112, a pair of aligned non-circular (preferably square) openings 184 in retaining blocks 180 and 181, a pair of aligned non-circular (preferably square) openings 186 in retaining blocks 178 and 179 rearward of openings 182, and a pair of like torsion bars 188 and 190 of circular cross-section but with ends shaped to mate with openings 184 and 186. Torsion bar 188 has one end anchored in opening 186 of block 179 and the other end extending through holes 182 in retaining block 178 and frame member 114 and anchored in opening 184 of retaining block 180. Torsion bar 190 is reversely mounted, having one end anchored in opening 186 of retaining block 178 and the other end extending through holes 182 in retaining block 179 and frame member 116 and anchored in opening 184 of retaining block 181. Cover plates 192 are attached to retaining blocks 180 and 181 to prevent axial movement of torsion bars 188 and 190. Opposite axial movement is limited by the fact that the holes 186 in retaining blocks 178 and 179 are covered by adjacent portions of channel members 114 and 116 (see FIG. 4). With this arrangement, the platen assembly can pivot on one end of torsion bar 188 and the opposite end of torsion bar 190 relative to the channel members 56 and 58. Additionally, the torsion bars 188 and 190 are preloaded (by twisting them as shown) so that they bias the platen assembly in a direction to hold it stationary in the raised position with only a modest force required to be exerted by the operator to lower it.

Figure 3:
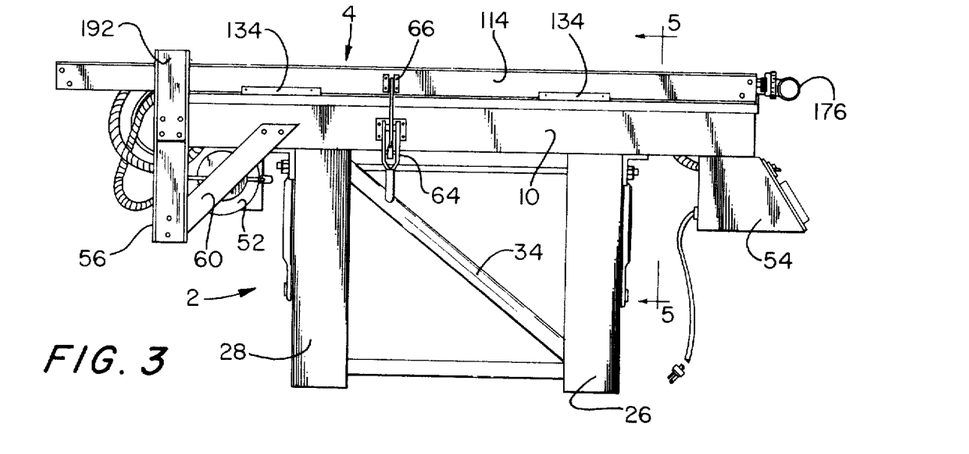
FIG. 3 is a view in side elevation of the same press.
Figure 4:
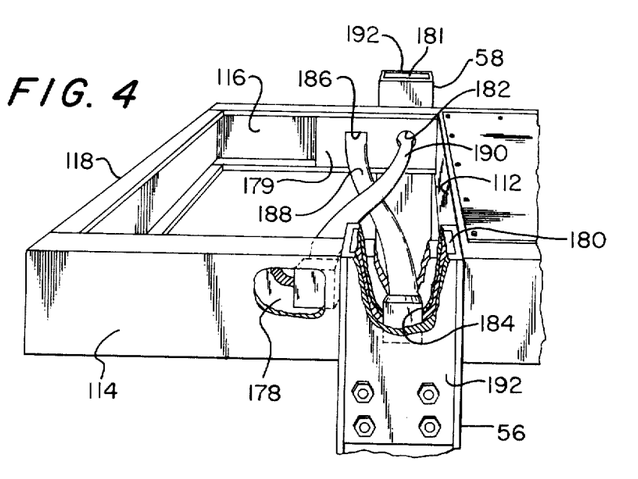
FIG. 4 is a perspective view, partly in section, showing the torsion bar arrangement for biasing the platen assembly to open position.

When the platen assembly is lowered to the position shown in FIGS 3 and 5, the platen engages the resilient gasket 51 and cooperates with flexible wall 40 to form a work-receiving chamber. However, it has been determined that members 114 and 116 may tend to bend due to torque applied thereto by the torsion bar arrangement, with the result that when the platen assembly is held in its down position, the platen may not seal tightly at all points along the edge attached to members 114 and 116 and hence the work chamber may not be sealed off from the atmosphere. As a result, it may not be possible to pull a vacuum in the chamber. This leakage problem can be avoided by making the frame of the platen assembly of more substantial members, but this will only increase the weight of the platen assembly. Instead, the problem is solved by toggle clamps 64. As seen in FIG. 3, clamps 64 are located about one-third of the distance between the pivot point and the front side of the platen assembly and the hooks 65 have a length such that when locked to brackets 66, the side frame members 114 and 116 are unbent enough to assure continuous sealing between the side margins of the platen and gasket 51.

The work chamber is evacuated by means of vacuum pump 52. For this purpose the platen is provided with a port 196 (FIG. 1) adjacent its rear end and this port is connected to pump 52 by a flexible hose line 198 (FIG. 2). With the platen assembly locked in closed position by toggles 64 and vacuum control valve 152 closed, operation of pump 52 will withdraw air and substantially all water vapor present from the work compartment and the reduced pressure in the compartment will be indicated by vacuum gauge 150. To brake the vacuum, as is necessary when the operator wishes to raise the platen assembly, it is necessary only to open valve 152, whereupon air will begin to bleed into the work compartment via port 174 and will also flow into the gauge. The gauge will go to zero vacuum rapidly. The pressure in the work chamber will rise more slowly, but in general, no more than about 15 seconds elapses before the pressure in the work chamber is high enough to permit the operator to easily break the seal between the platen and the gasket and raise the platen assembly to expose the work.

Turning now to FIG. 1, the control console includes two identical motor driven timers 200 and 202, three toggle switches 204, 206 and 208 and a push-button start switch 210, plus indicator lights 212 and 214 associated with toggle switches 204 and 206. Switch 204 is a power supply switch for coupling the press to a suitable power supply. Switch 206 is for turning on the vacuum pump and switch 208 controls operation of the heating unit 140 through thermostat 156. The two timers are of the type which when energized will operate for a preselected time period and will then reset and include contacts, as shown in said U.S. Pat. No. 3,738,890, which open or close at preselected times within the time period. The timers are connected so that timer 202 starts when timer 200 times out and resets itself. The aforementioned components of the control console are connected together with vacuum pump 52, and heater unit 140 in a circuit arrangement (not shown) like that shown in said U.S. Pat. No. 3,738,890 for supplying electrical power to and controlling operation of the press. As described in said U.S. Pat. 3,738,890 electrical system provides an automatic operating sequence and allows the press to be cooled down to room temperature after each use or to be maintained betwween cycles at a selected preheat temperature determined by the setting of thermostat 156. The electrical system affords a two-level temperature control which facilitates substantially complete removal of moisture and other vaporized components of the workpiece before lamination is effected. Thus, in the case of a workpiece consisting of a backing sheet or substrate, an adhesive dry-mount tissue overlying the backing sheet, a photograph overlying the dry-mount tissue, and a sheet of adhesive laminating film overlying the image side of the photograph, the backing sheet usually contains a relatively large amount of moisture which vaporizes readily under heat and the activating temperature of the laminating film adhesive is usually higher than the adhesive of the dry mount tissue. If the temperature of the workpiece is immediately raised to the activating point of the adhesive layer of the transparent laminating film, bonding will occur before substantially complete removal of water vapor has been effected from the interface between the graphic arts sheet and the laminating film, with the result that the finished product will have bubbles. Before bonding occurs, sufficient time must elapse to permit the moisture that has been released by heat to diffuse out from between the sheets that make up the workpiece and be removed from the work chamber by the vacuum pump. Therefore, in practice the lower operating thermostat 156 is set so as to open the power circuit to the heater at a temperature approximately equal to the boiling point of water at atmospheric pressure, but below the activating temperature of the laminating film adhesive, and the preheat timer 200 is set so that the press remains under the control of thermostat 156 for a period sufficient for all free moisture and other gases to be evacuated. The final heat thermostat 158 is set at or slightly above the activating point of the laminating film adhesive, thereby assuring that all of the adhesives in the workpiece are activated. Usually the adhesive of the dry-mount tissue has an activating temperature sufficiently below that of the laminating film adhesive to allow the thermostat 156 to be set at a temperature such that the dry-mount tissue will bond to adjacent sheets during the time free moisture removal is occurring but the laminating film will remain unbonded until the heaters reach the temperature level set by thermostat 158. As the vacuum pump operates continuously there is complete removal of moisture between the transparent film and the photograph, so that no air bubles are formed between those components of the product even though the photograph has become permanently mounted to the backing material by means of the dry-mount tissue. Alternatively, if the activation temperatures of the several adhesives in the workpiece are not sufficiently different to allow the above procedure, the thermostat 156 may be set at a temperature below that at which the dry-mount tissue will bond adjacent sheets, thereby allowing removal of free moisture prior to any bonding. Regardless of the procedure used, the workpiece is evenly heated since the hot platen is substantially isothermal.

To understand the operation and advantages of the present invention, assume that a photograph is to be dry-mounted to a sheet of ⅛ inch Masonite using a dry-mounting tissue coated on both sides with an adhesive that is activated at a temperature of 190°F and also is to be laminated on its image side with a transparent Mylar film coated on its facing side with an adhesive that is activated at a temperature of 245°F. The thermostats 156 and 158 are set so that they will open at 210° and 270°F respectively and the timers are set so that timer 200 will time out 10 minutes after it starts and timer 202 will time out 15 minutes after it starts (i.e. 25 minutes from the beginning of the heat cycle). Toggle switches 204 and 208 are closed to energize the platen heater. After or before the press has come up to temperature as determined by thermostat 156, a porous mat is placed on top of the flexible wall 40. Preferably the mat is made of fiberglass or other suitable heat resistant flexible material that is readily permeable to moisture and air. The porosity of the mat facilitates removal of moisture from the workpiece. It is to be noted that the mat may be retained in the press for reuse in successive lamination operations. Next the workpiece, consisting of the sheets of Masonite, dry-mount tissue, and laminating film, plus the photograph, is placed on the mat with the Masonite sheet facing the mat and the laminating film on top. As an optional measure, aa sheet of craft paper or preferably a silicone-coated release paper is placed over the sheet of laminating film to help keep the work relatively flat while the platen assembly is lowered. Then the asbestos panel 86 is raised by the operation of the four screw mechanisms 92 so that the workpiece (represented in phantom by the broken line 230 in FIG. 5) will be at a convenient level close to but spaced from the platen when the platen assembly is closed. The sheets of the workpiece are smoothed out and then the platen assembly is lowered and locked in place with the toggles 64 so that the platen 132 and gasket 51 coact to seal off the work chamber. The toggle switch 206 is closed to activate vacuum pump 52 and push button switch 210 is depressed to start the operation, i.e. to start timer 200. Operation of the vacuum pump evacuates the work chamber of air and water vapor and as this occurs, the flexible wall 40 is drawn up toward the platen as a result of the difference between the pressures on its opposite sides. The vacuum pump pulls a vacuum sufficient for the flexible wall to press the workpiece against the platen under a pressure of approximately 10–13 pounds per square inch. Simultaneously, under the influence of the applied pressure differential, the platen 132 will flex as required to compensate for any deviations in the flatness of its surface or in the thickness of the workpiece, i.e., the platen will yield as required to provide intimate contact with the cover sheet of kraft or silicon-coated release paper over the full expanse of the workpiece, whereby the several layers of the workpiece are compressed together at all points. Timer 200 times out and then timer 202 starts running, whereupon power is supplied to the heating unit 140 to raise the platen temperature in accordance with the setting of thermostat 158. As the temperature of the workpiece rises to the level determined by the thermostat 158, the adhesive coatings on both sides of the dry mount tissue are activated first, and because of the applied pressure, the dry-mount tissue is bonded to both the photograph and the Masonite backing sheet. As the temperature continues to rise, the adhesive on the back of the Mylar sheet is activated and the applied pressure causes it to be bonded to the photograph. As soon as timer 202 times out, the operator opens valve 152 to break the vacuum seal, releases the toggle clamps, raises the platen assembly and removes the finished product. The platen now cools to the temperature determined by thermostat 156 (because of toggle switch 208 being closed) so that the press is in standby condition ready for reuse without need for preheating.

Obviously the press may be used solely for dry-mounting or solely for laminating. Removal of water is less of a requirement where only dry-mounting is to be performed and hence it is possible to operate in a single temperature mode with the thermostat 156 set so that the temperature of platen 132 will be held at a level just sufficient to activate the adhesive of the dry mount tissue. Straight dry mounting can also be accomplished with the press operating in a dual temperature mode, the platen being kept at a lower preheat temperature while in the standby condition and being raised to a higher adhesive-activating temperature after the press is closed.

It is also obvious that the press may be constructed otherwise than as described. Thus the flexible wall 40 may be secured to its supporting frame in a manner other than as described and the adjustable support 70 may be omitted. Furthermore, the resilient seal member or gasket 51 may be an integral part of the work-supporting wall 40 (e.g. it may be a rib molded as part of wall 40) or it may be attached directly to the flat metal platen 132. It is to be understood also that gasket 51 is used because the work-supporting wall 40 is relatively thin and will not compress enough under the weight of the platen assembly to form a tight edge seal with the platen 82. Hence gasket 51 may be omitted if the work-supporting wall has sufficient resiliency to be compressible to the extent required to make a good seal. Thus as a further alternative measure, gasket 51 may be omitted and the work-supporting wall 40 may comprise a flexible air impermeable sheet having a layer of resilient material (such as silicon rubber) on its upper side that extends over the frame of the work support assembly so as to provide the same sealing function as gasket 51.

What is claimed is:

1. A vacuum press comprising:
    a work-support assembly including a first frame defining a first opening, means supporting said first frame, and a pliable air-impermeable sheet extending across said first opening and secured at its edges to said first frame, said sheet drooping between its edges;
    a platen assembly disposed above and hingedly connected to said work-support assembly so as to be movable into and out of engagement with said work-support assembly, said platen assembly including a second frame defining a second opening, a flexible metal platen extending across said second opening and overlapping the underside of said second frame, said metal platen being supported only at its edges by said second frame so that (a) said metal platen can droop between its edges under its own weight and (b) the edges of said metal platen are free to move relative to said second frame on expansion and contraction of said metal platen in response to changes in temperature thereof, and electrical heater means for heating said metal platen, said heater means being disposed within said second opening above said metal platen;
    said platen assembly and said work-support assembly when engaged providing an air-tight work-receiving chamber therebetween with said metal platen and said flexible sheet forming opposite side walls of said chamber;
    means for evacuating said chamber so that the atmospheric pressure exterior of said chamber will force said flexible sheet and said metal platen toward each other and thereby compress a workpiece supported on said sheet; and
    control means for operating said electrical heater means and said evacuating means so that a workpiece in said chamber is both heated and compressed.

2. A vacuum press according to claim 1 wherein said heater means is flexible and is attached to said metal platen.

3. A vacuum press for bonding sheet materials together under heat and pressure comprising:
    a work support assembly that includes a first open frame and a pliable air-impermeable wall extending across and supported at its edges by said first frame, said sheet drooping between its edges; and
    a platen assembly mounted above and hingedly connected to said work support assembly so as to be capable of movement between a first position in which the upper side of said wall is exposed to view and a second position in which said platen assembly is in engagement with said work support assembly and the upper side of said wall is concealed from view;
    said platen assembly including a second open frame and a flexible metal platen supported by and extending across said second frame, said metal platen being disposed so that when said platen assembly is in said second position said metal platen and said flexible wall form an air-tight compartment for sheets to be laminated, said platen assembly including platen support means attached to said second frame which overlap and slidably engage edge portions of said metal platen so that said metal platen is free to expand and contract in its own plane in accordance with changes in temperature thereof, the portion of said metal platen which extends across said second frame being free to droop of its own weight, and heating means in said platen assembly for heating said platen; and
    evacuating means for withdrawing air and moisture from said compartment so that said wall is forced toward said metal platen by atmospheric pressure and the sheets to be laminated are compressed together by said metal platen and said wall.

* * * * *